(12) United States Patent
Oden et al.

(10) Patent No.: US 8,472,100 B2
(45) Date of Patent: Jun. 25, 2013

(54) MULTILAYERED DEFORMABLE ELEMENT WITH REDUCED MEMORY PROPERTIES IN A MEMS DEVICE

(75) Inventors: Patrick Ian Oden, McKinney, TX (US); Larry Joseph Hornbeck, Van Alstyne, TX (US); Simon Joshua Jacobs, Lucas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 691 days.

(21) Appl. No.: 12/046,598

(22) Filed: Mar. 12, 2008

(65) Prior Publication Data

US 2009/0231673 A1    Sep. 17, 2009

(51) Int. Cl.
*G02B 26/08* (2006.01)
(52) U.S. Cl.
USPC .................................. 359/224.1; 359/904
(58) Field of Classification Search
USPC .......... 359/198.1–199.4, 200.6–200.8, 202.1, 359/221.2, 223.1–225.1, 226.2, 290–295, 359/838, 846, 871, 872; 250/204, 559.06, 250/559.29, 230, 234; 347/255–260; 353/39, 353/98–99; 385/15–18, 22; 398/12, 19, 45
See application file for complete search history.

(56) References Cited

U.S. PATENT DOCUMENTS

| | | | |
|---|---|---|---|
| 4,662,746 A | 5/1987 | Hornbeck | |
| 4,710,732 A | 12/1987 | Hornbeck | |
| 5,061,049 A | 10/1991 | Hornbeck | |
| 5,083,857 A | 1/1992 | Hornbeck | |
| 5,202,785 A | 4/1993 | Nelson | |
| 5,233,456 A | 8/1993 | Nelson | |
| 5,280,277 A | 1/1994 | Hornbeck | |
| 5,565,671 A | 10/1996 | Kirkeby et al. | |
| 5,739,941 A | 4/1998 | Knipe et al. | |
| 5,808,780 A | 9/1998 | McDonald | |
| 5,835,256 A | 11/1998 | Huibers | |
| 6,046,840 A | 4/2000 | Huibers | |
| 6,172,797 B1 | 1/2001 | Huibers | |
| 6,356,378 B1 | 3/2002 | Huibers | |
| 6,538,800 B2 | 3/2003 | Huibers | |
| 6,690,502 B2 | 2/2004 | Huibers | |
| 6,798,561 B2 | 9/2004 | Huibers | |
| 6,804,039 B1 | 10/2004 | Doan et al. | |
| 6,849,471 B2 | 2/2005 | Patel et al. | |
| 6,947,200 B2 | 9/2005 | Huibers | |
| 6,950,223 B2 | 9/2005 | Huibers et al. | |
| 7,138,693 B2 | 11/2006 | Patel et al. | |
| 2002/0047172 A1 | 4/2002 | Reid | |
| 2005/0147750 A1 | 7/2005 | Jacobs et al. | |
| 2008/0074726 A1* | 3/2008 | Sohn et al. .............. | 359/291 |

* cited by examiner

*Primary Examiner* — Jennifer L. Doak
(74) *Attorney, Agent, or Firm* — Warren L. Franz; Wade J. Brady, III; Frederick J. Telecky, Jr.

(57) ABSTRACT

A deformable element for use in microelectromechanical systems comprises a core layer and a protective layer. The protective layer is capable of deterring combinations of undesired chemical components in operational environments with the core layer of the deformable element.

29 Claims, 7 Drawing Sheets

MULTILAYERED DEFORMABLE ELEMENT WITH REDUCED MEMORY PROPERTIES IN A MEMS DEVICE

TECHNICAL FIELD OF THE DISCLOSURE

The technical field of this disclosure relates to the art of microelectromechanical systems; and more particularly to the art of multilayered deformable elements with reduced memory properties in microelectromechanical systems.

BACKGROUND OF THE DISCLOSURE

Microelectromechanical systems (hereafter "MEMS") are a type of microstructure devices. Current MEMS devices often employ deformable or flexible elements (hereafter "deformable elements") to achieve desired functions. A MEMS device having a deformable element, however, may suffer from performance degradation and even device failure when the deformable element of the MEMS device experiences accumulation of permanent deformation during operation, especially during repeated actuation or deformation of the deformable element in operation. For example, a micromirror device with a torsional hinge may establish therein permanent deformation during state transitions; and the permanent deformation can be accumulated through repeated actuation. As a consequence, the accumulated deformation, which is also referred to as "deformation memory" or "memory properties" can bias the designed operational states of the micromirror device—resulting in performance degradation and even device failure. This same type of accumulated memory can occur in many other types of MEMS devices besides the exemplary micromirrors having torsional hinges.

Therefore, what is needed is a method to minimize or eliminate memory accumulation in deformable elements of a MEMS device without substantially sacrificing the deformation ability of the deformable element of the device.

SUMMARY

In view of the foregoing, disclosed herein is a method for reducing memory properties of deformable elements in MEMS devices by forming protective layers on surfaces of the deformable elements. The formed protective layers are capable of substantially isolating the deformable elements from being exposed to chemical elements in the operational environments, especially those constituents that can change the mechanical properties (e.g. deformation properties) of the deformable elements in the MEMS device.

In one example, a microelectromechanical device is disclosed herein. The device comprises: a substrate; a deformable element held on the substrate; and a protective layer for blocking a combining of an unwanted chemical component with the deformable element, wherein said unwanted chemical component is capable of changing a mechanical property of the deformable element if combined with the deformable element.

In another example, a microelectromechanical device is provided herein. The device comprises: a substrate; a deformable element held above the substrate; and a thin film of getter material disposed on a major surface of the deformable hinge.

In yet another example, a microelectromechanical device is provided. The device comprises: a first member that is electrically conductive; a deformable element, comprising: an electrically conductive layer; and an electrically insulative protective layer comprising an opening: a connector for electrically connecting the electrically conductive layer of the deformable element to the first member through said opening in said electrically insulative layer.

In yet another example, a microelectromechanical device is provided. The device comprising: a substrate; and a deformable element, comprising: an electrically conductive core layer; first and second electrically insulating layers at the top and bottom major surfaces of the conductive core layer; and first and second protective layers disposed on the top and bottom major surfaces of the first and second insulating layers.

BRIEF DESCRIPTION OF DRAWINGS

FIG. 2b schematically illustrates another cross-sectional view of the exemplary micromirror device in FIG. 2a;

DETAILED DESCRIPTION OF SELECTED EXAMPLES

Figure 1:
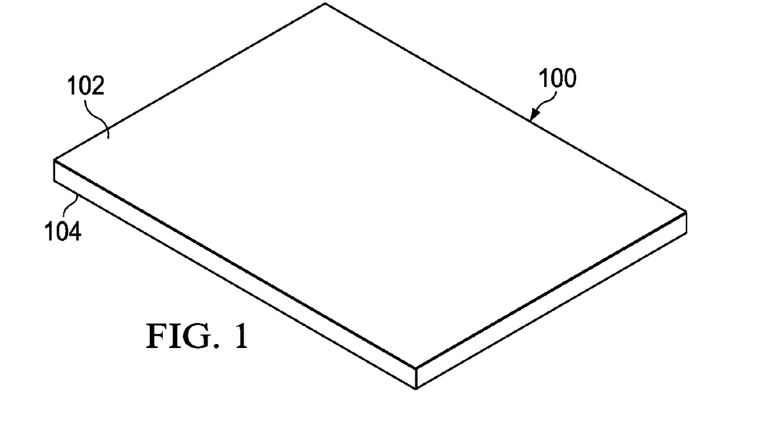
FIG. 1 schematically illustrates a perspective view of a portion of a deformable element in a MEMS device.

For demonstration purposes, an exemplary deformable element in a MEMS device is schematically illustrated in FIG. 1. Element 100 is capable of deforming in response to a force applied to the body of the deformable element. In this disclosure, deformation is referred to as a change in geometric shape or size due to an applied force. As known in the art, the geometric expression of deformation is strain; and the force applied to the body of the deformable element is referred to as stress. Strain can be measured based upon the difference between the initial body state and the final body state of the deformable element.

The stress causing the strain in a deformable element can be a wide range of forces, such as tensile (pulling) forces, compressive (pushing) forces, shear forces, bending forces, torsional forces, or any combinations thereof. The stress can be applied to the deformable element with reference to an anchor (or static portion); while the anchor can be an end portion (e.g. 102 or 104) of the deformable element, or can be a portion within the deformable element. Accordingly, the deformable elements in a MEMS device can experience different amounts of deformation during operation. For example, a deformable hinge in a micromirror device can be a torsional hinge, experiencing torsional deformation. A cantilever beam in a micro-accelerometer or a MEMS-based micro-bolometer can be a spring hinge. As an example, FIG. 2a and FIG. 2b schematically illustrate an exemplary torsional hinge in a micromirror device.

Figure 2A:
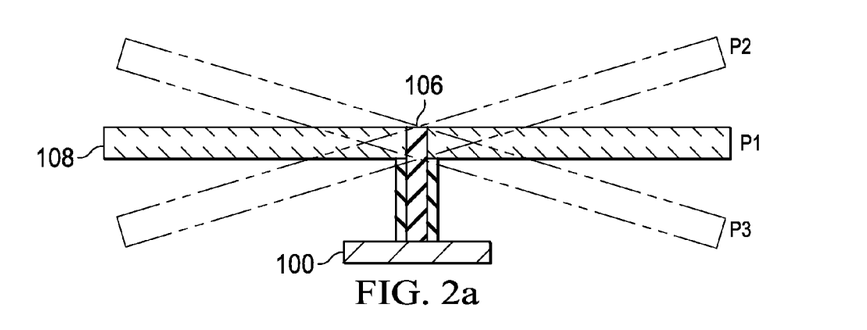
FIG. 2a schematically illustrates a cross-sectional view of an exemplary micromirror device having a torsional hinge to which a reflective mirror plate is attached.

Referring to FIG. 2a, deformable hinge 100 is a torsional hinge. Reflective mirror plate 108 is attached to the deformable hinge (100) through a mirror post (106) such that the mirror plate is capable of moving (e.g. rotating), e.g. rotating to positions $P_1$, $P_2$, and $P_3$. In this example, the deformable hinge (100) deforms in a direction orthogonal to the plane of the paper, which is better illustrated in another cross-sectional view as schematically illustrated in FIG. 2b.

Figure 2B:
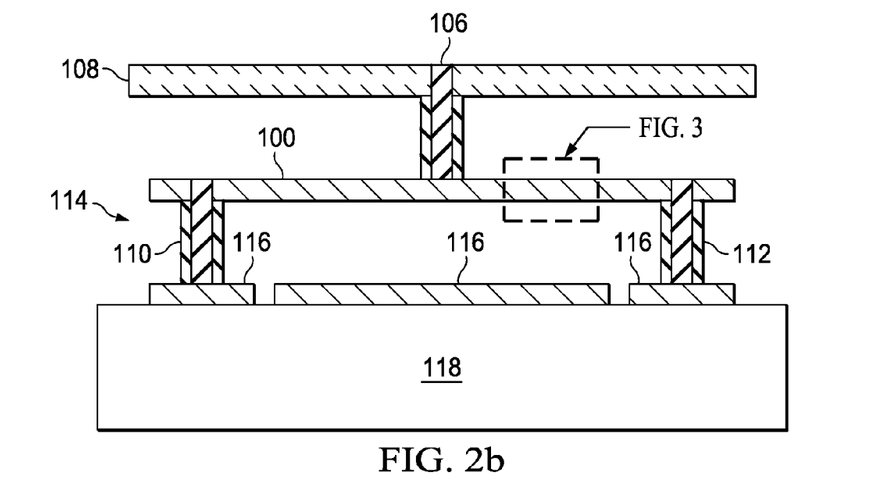

Referring to FIG. 2b, reflective mirror plate 108 is attached to deformable hinge 100 through mirror post 106. The deformable hinge is held by hinge posts 110 and 112 at both ends of the elongated deformable hinge (100). The hinge posts 110 and 112 are formed on electrode layer 114 that is formed on substrate 118. With this configuration, the mirror plate (108) is capable of rotating above the substrate (118), for example, in response to electrostatic fields established between the mirror plate and the electrodes formed in electrode layer 114.

The deformable elements, such as the deformable element (100) as discussed above with reference to FIG. 1, FIG. 2a, and FIG. 2b, however, may be accompanied by deformation memory accumulation due to repeated actuation during operation. This memory accumulation can be caused by many factors, one of which is a combination of chemical components in the operational environment (e.g. package environment) with a surface of the deformable element. Depending upon the exact nature of the chemical components in the operational environment, the combination with the surface can be based on different mechanisms or in different forms, such as chemical, physical, or physical-chemical absorption or adsorption of the chemical components by the surface(s) or bodies of the deformable element.

The chemical components that may cause memory accumulation in deformable elements through combination with the deformable elements can be constituent chemical components or any ingredient components in environments in which the deformable elements are operated. In one example, a chemical vapor in an operational environment can be for example absorbed or adsorbed by a deformable element, such as a torsional hinge in a micromirror device—resulting in a certain amount of undesired chemical content in the deformable element. The chemical content can cause memory accumulation in the deformable element, thus degrading the performance of the deformable element. Residues from manufacturing the MEMS device, or packaging the device, or outgassing of materials in the MEMS device or package, may contribute chemical components that can react with a surface of the deformable component of the MEMS device.

The memory accumulation can be reduced or eliminated by forming a protective layer on the target surface(s), such as the major surface(s), of the deformable element so as to substantially isolate the deformable element from being exposed to unwanted chemical components in the operational environment. Depending upon the specific manufacturing process, major surfaces of the deformable element can be covered by protection layers or substantially all exposed portions of the deformable element can all be covered by protective layers. For example, protective layer(s) can be formed during the fabrication process for the deformable element (e.g. during the fabrication of the core layers of the deformable element). As a consequence, the major surfaces of the deformable element can be covered by the protective layers; while edges and/or the side facets of the deformable element may or may not be covered by the protective layers.

When the protective layers are formed after the fabrication process for the deformable element (e.g. the core layer of the deformable element), the protective layers can be formed, for example, by a standard thin film fabrication process (e.g. a vapor deposition process). As a consequence, substantially all exposed surfaces, including the major top and bottom and side surfaces of the deformable element can be covered by the protective layers.

Depending upon the nature of the unwanted chemical components in operational environments, the protection layer can be composed of any suitable materials such that the protective layer formed by the material(s) can effectively prevent unwanted chemical components in the operational environment from contacting and/or reacting with the surface of deformable element. In examples wherein etching processes for removing sacrificial materials are to be performed in fabricating a MEMS device, the material of the protective layer is preferably resistant to the selected etching processes, or at least more resistant than the deformable element to the selected etching processes. The protective layer of a selected material can be chemically or physically bonded to the surface(s) of the deformable element, or can be attached to the surface(s) of the deformable hinge in other ways. Because the protective layer is preferably (though not required) disposed on major surfaces of the deformable element; and actually can be a member of the deformable element, the formed protective layer is preferably deformable with the desired thickness such that when formed on a major surface of the deformable element, the protective layer deforms with the deformable element; and does not separate from the deformable element.

In one example, the protective layer can comprise a material that is an electrical conductor, an electrical insulator, or a semiconductors, which are preferably, though not required, amenable to planar deposition methodologies and can be patterned and etched.

In another example, the protective layer can comprise getter material that comprises any of inorganic salts capable of forming stable hydrates (e.g. $CaSO_4$, $MgSO_4$, and $MgClO_4$), zeolites, or cage structured aluminates or aluminosilicates which are preferably in thin-film form, aerogel/xerogel forms of transition metal oxides, aerogel/xerogel forms of organometallic polymers such as poly(silsesquioxanes) or more generally organic/ceramic hybrids/copolymers (ceramers) including but not limited to ceramers comprising nanoparticles within an organic or organometallic matrix, and structures formed by atomic layer deposition of suitable organometallic precursors followed by plasma treatment to remove a substantial fraction of the organic portion.

In yet another example, the protective layer can comprise a chemically and/or physically bonded material released onto the deformable elements, such as materials have significant humidity deterring properties. Comprised in this list of materials can be: polymers fabricated by chemical vapor deposition (e.g. parylene and other poly (p-xylylene) structures), in-situ deposited fluoropolymers (e.g. from $C_4F_8$-type Bosch DRIE chemistry), polymers vapor deposited from suitable precursors which go through thermolysis to yield highly reactive intermediates (e.g. hexafluoropropylene oxide (HFPO)), polymers formed by attaching a functionalized SAM (e.g. vinyl-terminated carboxylic acids and inducing the attached functional groups to undergo a reaction with a gas-phase species), and oxides formed by atomic layer depositions.

It is noted that a single protective layer may comprise different materials, such as multiple materials discussed above. Multiple protective layers of the same or different materials can be applied to a single deformable member. Specifically, multiple protective layers of the same or different materials can be employed to protect the same target surface of a deformable element. In this instance, the multiple protective layers can be stacked consecutively on the target surface; or can be formed on the same plane on the target surface.

Depending upon the properties of the selected material, a protective layer of the selected material can be formed in Rail many different ways, such as sputtering, CVD, PVD, PECVD, or other thin-film fabrication methods. The protective layer can be deposited and patterned prior to release of the device (removal of the sacrificial layer resulting in a movable element), or after release of the device but before packaging. Also a reservoir of protective material can be placed in the package so as to be released into the package environment at the time of package sealing or over time during use of the device.

Examples of the protective layer as discussed above can be employed to protect an exceedingly wide range of deformable members with different materials that can be electrical conductors, insulators, semiconductors, or other materials. In one example, the deformable element can comprise an electrically conductive material that can be selected from elemental metal substances, metalloids, inter-metallic compounds, conductive ceramics, and metal alloys. Examples of materials for the deformable element can be $TiAl_x$, a metal such as aluminum, titanium, Ir, Cu, W, etc., a compound such as titanium oxide, titanium carbide, titanium nitride, silicon nitride, silicon carbide, etc. or other intermetallic compounds or compounds that are e.g. nitrides or oxides of metalloids and/or transition metals, such as early transition metals, or any combinations of such aforementioned materials. The deformable elements may also comprise other ternary and higher compounds, such as $WAl_{x1}$, $NiAl_x$, $TiSi_xN_y$, $TaSi_xN_y$, or other ternary or higher compounds.

It is noted that and as will be detailed in the following, a single deformable member in a MEMS device can be a laminate comprising multiple layers; while the layers may or may not all be electrically conductive.

Figure 3:
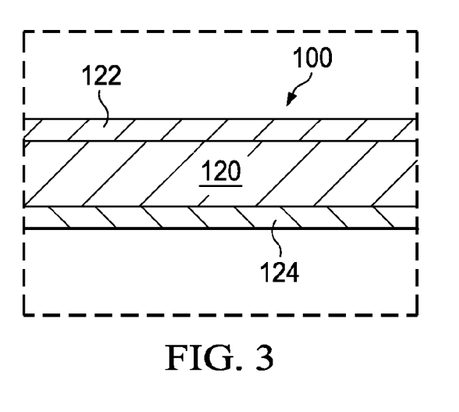
FIG. 3 schematically illustrates a cross-sectional view of an exemplary deformable element having protective layers formed on major surfaces.

For demonstration purposes, FIG. 3 schematically illustrates a cross-sectional view of a portion of an exemplary deformable element in a MEMS device. Referring to FIG. 3, deformable element 100 in this example comprises core layer 120. A core layer of a deformable element in this disclosure is referred to as the component of the deformable element such that the core layer alone can be sufficient to accomplish the desired mechanical property or properties of the deformable element. Core layer 120 in this example can be subject to mechanical property change (e.g. memory accumulation) when exposed and operated in an environment having unwanted chemical components. For example wherein core layer 120 comprises $TiAl_x$, the $TiAl_x$ layer may experience memory accumulation when exposed and repeated operated in an environment that has vapor or liquid compound.

For protecting the core layer (120), protective layers 122 and 124 can be formed on the top and bottom major surfaces of core layer 120. Specifically, each one or both of the protective layers can be formed such that substantially all of the top and bottom surfaces of the core layer (120) are insulated from the operational environment. In other examples, the top and bottom major surfaces may not all be protected by protective layers.

The protective layers 122 and 124 each may comprise a material as discussed above; and be formed according to the specific protective material. For example wherein the protective layer comprises $TiN_x$, such $TiN_x$ protective layer can be formed by a standard sputtering technique or other suitable thin-film fabrication methods. In order to maintain the mechanical balance, for example, to prevent possible deformation due to protective layers of different materials and/or different thicknesses, the top and the bottom protective layers 122 and 124 preferably comprise the same material with substantially the same thickness. However, in other examples, the top and bottom protective layers 122 and 124 may comprise any desired materials with any desired thicknesses.

The protective layers 122 and 124 each may have any suitable thicknesses. In one example, each one of the top and bottom protective layers 122 and 124 may have a thickness from 5 angstroms to 1000 angstroms, and more preferably from 10 to 500 angstroms, such as from 20 to 100 angstroms. Other thickness values are also applicable.

In one example, the thickness of a protective layer can be related to the thermal properties of the unwanted chemical component(s) in an operational environment, and/or to the susceptibility of the mechanical property of the core layer in the deformable element to the instant thermal property of the unwanted chemical components in the operational environment. For example, the thickness of the protective layer (122 and/or 124) can be determined based upon the density (or the temperature) of the unwanted chemical components in an operational environment in which the MEMS device is to be operated. The higher the density, the thicker the protective layer is for a core layer with given susceptibility to the unwanted chemical components in the operational environment.

For a given operational environment (with given thermal property of unwanted chemical components), the thickness of each one of the protective layers 122 and 124 can be determined based upon the thickness of the core layer comprising a given material. For example, each one or both of the protective layers 122 and 124 can be thicker with increased thickness of the core layer.

Either one or both of the protective layers (122 and 124) may exhibit a property that varies with operational environment, which can be utilized for enhanced protection purposes. Specifically, each one or both of protective layers (122 and 124) can be configured such that the protective layers exhibit different capabilities (e.g. transportation, transmissive, combining, and other properties) to unwanted chemical components in the operational environment at different operational conditions, such as different or different ranges of temperatures, electrical fields, magnetic fields, electromagnetic fields, and pressures. In one example, either one or both of the protective layers (122 and 124) can be configured such that the protective layer(s) exhibits a higher diffusion coefficient to a specific unwanted chemical component (e.g. vapor) in an operational environment at an elevated temperature range (e.g. from 70° C. to 300° C. or other ranges); and exhibits a lower diffusion coefficient to the chemical component at a lower temperature range (e.g. from room temperature to 70° C. or other ranges). For example, a protective layer can be configured to have the first diffusion coefficient at the low temperature range; and the second diffusion coefficient at the elevated temperature range. The first diffusion coefficient can be 20% or less, 10% or less, 5% or less, 1% or less of the second diffusion coefficient. As a consequence, the protective layer(s) forms a diffusion channel, through which unwanted chemical components combined with the core of the deformable element can be released from the core of the deformable element at an elevated temperature.

At a lower temperature, such as n temperature at which the deformable element is operated, the unwanted chemical component is stopped by the protective layer(s) due to low diffusion coefficient. For demonstration purposes, FIG. 4a through FIG. 4b schematically illustrate an exemplary deformable element having protective layers that exhibit different diffusion coefficients at different temperatures.

Figure 4A:
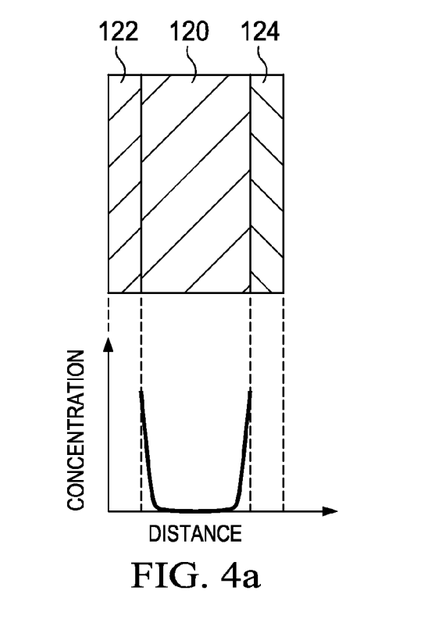
FIG. 4a through FIG. 4c schematically demonstrate protective behaviors of protective layers in an exemplary deformable element; wherein FIG. 4a schematically illustrates the deformable element being operated in a normal temperature range; wherein FIG. 4a schematically illustrates the deformable element being operated in an elevated temperature range and unwanted chemical species trapped inside the core layer of the deformable element can be released through the protective layers; and wherein FIG. 4c schematically illustrates the deformable element being operated in a lower temperate after operation in an elevated temperature.

Referring to FIG. 4a, the deformable element comprises core layer 120 and protective layers 122 and 124 that are disposed on the major surfaces of the core layer (120). The deformable element is exposed at a normal temperature, such as the temperature at which the deformable element is operated.

The lower diagram in FIG. 4a schematically demonstrates the distribution, which is represented by the concentration, of an unwanted chemical component across the layers of the deformable element. It can be seen from the diagram that the core layer (120) has the lowest concentration of the unwanted chemical component; while the concentration is higher at the boundaries of the core layer and the protective layers and within the protective layers due to the protection of the protective layers.

Figure 4B:
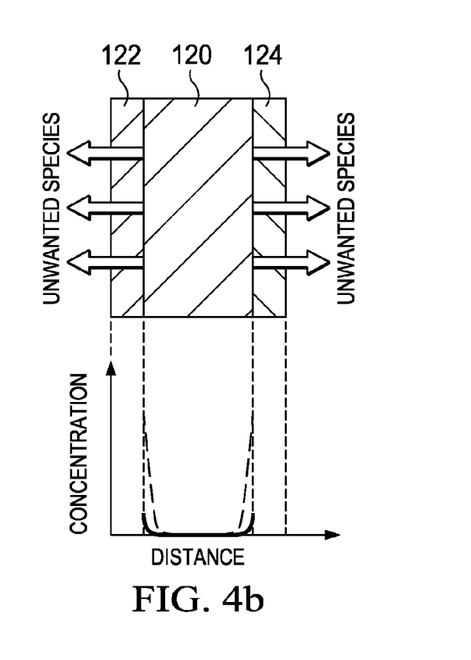

At an elevated temperature as schematically illustrated in FIG. 4b, the protective layers 122 and 124 exhibit a higher diffusion coefficient (or coefficients). Unwanted chemical component combined with the core layer (122) of the deformable element is capable of passing through the protective layers due to the higher diffusion coefficient(s) of the protective layers. As a consequence, the unwanted chemical components in the core layer (120) can be released from the core layer through diffusion by raising the temperature.

Figure 4C:
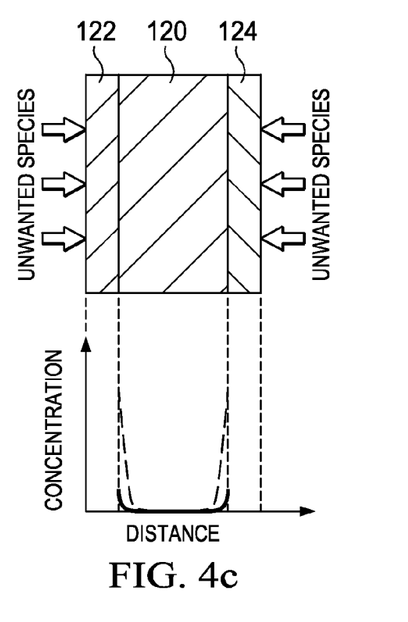

When the operational temperature is lowered as schematically illustrated in FIG. 4c, the previously released chemical component, as well as the unwanted chemical component in the operational environment, is prevented from contacting with the core layer (120) by the protective layers due to the lowered diffusion coefficient(s) of the protective layers.

The protective layer(s) as discussed above with reference to FIG. 4a through FIG. 4c provides an effective method for actively and dynamically controlling the content of the unwanted chemical component in the core layer (or the deformable element), as well as the protective behavior(s) of the protective layer(s). For example, by adjusting the actual temperature (e.g. through a heating mechanism) of the operational environment (e.g. the package having the deformable element), the content of specific chemical component in the core layer of the deformable element or in the deformable element. In one example wherein the deformable element is enclosed within a package that comprises a package substrate and a package cover, a heating mechanism, such as a heater, can be disposed within the package or attached to a package member (e.g. the package substrate) or another packaged member (e.g. a substrate on which the deformable element is formed). The heating mechanism can be in any suitable forms, such as conductive wires, plates, and other forms.

Figure 5:
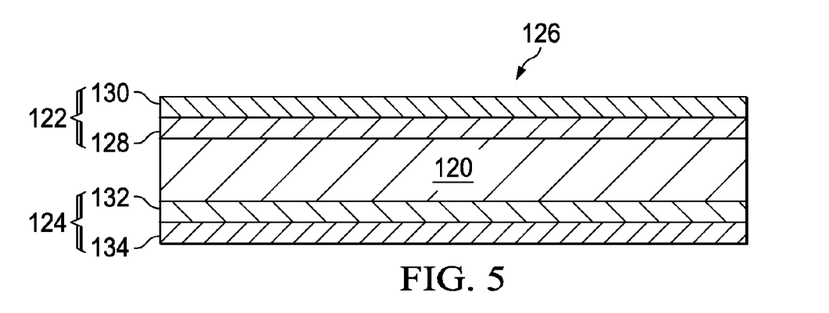
FIG. 5 schematically illustrates a cross-sectional view of another exemplary deformable element having protective layers formed on major surfaces, wherein each one or both of the protection layers are multilayered structures.

Either one or both of the protective layers 122 and 124 as discussed above with reference to FIG. 3 and FIG. 4a through FIG. 4c can be a laminate comprising multiple protective layers, as schematically illustrated in FIG. 5a. Referring to FIG. 5a, protective layers 122 and 124 are formed on the top and bottom major surfaces of core layer 120 of deformable element 126. The protective layers 122 and 124 in this example each is a laminate comprising multiple layers. Specifically, protective layer 122 comprises layer 130 and 128; and protective layer 124 comprises layers 132 and 134.

Layers 130, 128, 132, and 134 each can comprise a protective material as discussed above; and may or may not have the same material. For maintaining the mechanical balance, for example to prevent possible deformation due to different materials or thicknesses of the layers on different sides of core layer 120, it is preferred, though not required, that layers 128 and 132 have the same material with substantially the same thickness; and so do layers 130 and 134.

In other examples, layers 128 and 132 may not have the same material and/or the same thickness; while the mismatch of the mechanical properties of layers 128 and 132 can be compensated by layers 130 and 134. For example, a non-zero stress can be caused by the mismatch of layers 128 and 132 due to different materials and/or different thicknesses; and such induced stress can cause deformation in core layer 120. By adjusting the material(s) and/or the thicknesses of layers 130 and 134, the stress induced by the mismatch of layers 128 and 132 can be canceled by the stress induced by the mismatch of layers 130 and 134. As a consequence, substantially no net stress induced by mismatches of protective layers (128, 130, 132, and 134) is applied to core layer 120.

As an example, layers 130 and 134 each comprise a getter material; and layers 128 and 132 each comprise a material such that layers 128 and 132 each acts as a barrier to prevent the combination of undesired chemical compound with core layer 120. In another example, layers 128 and 132 each comprise a getter material for absorbing the unwanted chemical species; while layers 130 and 134 are barrier layers for blocking the unwanted chemical species. Other configurations are also applicable. For example, the group of layers 128, 130, 132, and 134 comprises one or more chemical compound barrier layers and one or more getter layers; and the barrier layer(s) and the getter layer(s) can be arranged in any suitable positions on the top and bottom major surfaces of core layer 120.

The protective layers 128, 130, 132, and 134 each can have a thickness determined by a method as discussed above for the thickness of protective layers 120 and 124 in FIG. 3 (or FIG. 4a through FIG. 4c), which will not be repeated herein.

Figure 6A:
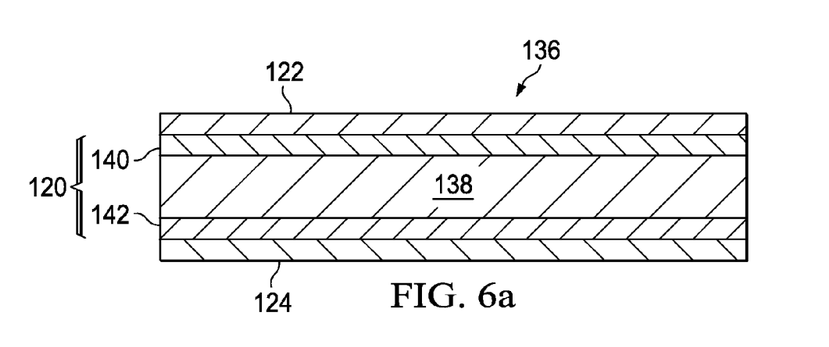
FIG. 6a schematically illustrates a cross-sectional view of yet another exemplary deformable element that comprises a deformable laminate and protective layers formed on major surfaces of the deformable laminate.

The core layer of a deformable element may also be a laminate having multiple layers, an example of which is schematically illustrated in FIG. 6a. Referring to FIG. 6a, deformable element 136 in this example comprises core layer 120 and protective layers 122 and 124 formed on the major surfaces of core layer 120. Core layer 120 is a laminate with multiple layers 140, 138, and 142, each of which can comprise a deformable material as discussed above.

As an example, deformable element 136 in FIG. 6a may comprise a $TiAl_x$ layer 138, a surface oxide e.g. $Al_xO_y$ layers 140 and 142, and $TiN_x$ layers 122 and 124. The $Al_xO_y$ layers 140 and 142 can be the result from the spontaneous oxidation of the surfaces of $TiAl_x$ layer 138 during fabrication. In this instance, the thickness of the $Al_xO_y$ layers 140 and 142 are related to the chemical reaction of the $TiAl_x$ layer 138 with the ingredient in the fabrication environment. In other examples, $Al_xO_y$ layers 140 and 142 can be formed intentionally with desired thickness (es).

Figure 6B:
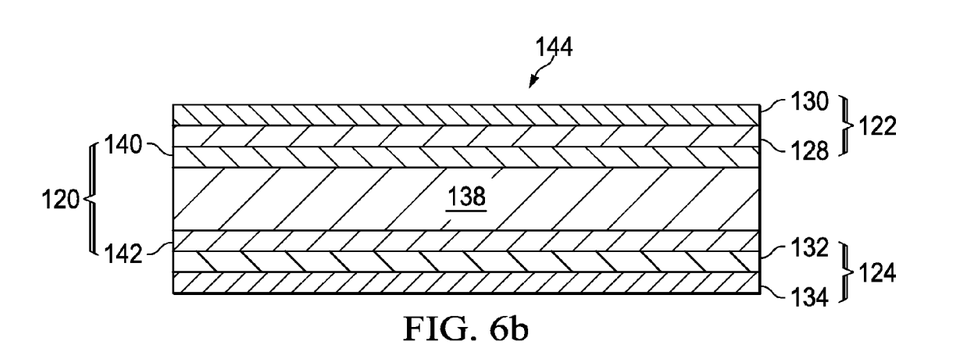
FIG. 6b schematically illustrates a cross-sectional view of yet another exemplary deformable element that comprises a deformable laminate and protective layers formed on major surfaces of the deformable laminate, wherein each one or both of the protective layers are multilayered structures.

Protective laminate layers, as discussed above with reference to FIG. 5a can be combined with the core laminate layers, an example of which is schematically illustrated in FIG. 6b. Referring to FIG. 6b, deformable element 144 comprises core laminate 120 that comprises multiple layers of 138, 140, and 142 as discussed above with reference to FIG. 6a. Protective layers 122 and 124 each are a laminate comprising multiple layers. Specifically, protective layer 122 comprises layers 128 and 130 as discussed above with reference to FIG. 5a. Protective layer 124 comprises layers 132 and 134 as discussed above with reference to FIG. 5a. The protective laminates (122 and 124) are formed on the top and bottom major surfaces of core laminate 120 so as to protect the core laminate 120.

In MEMS devices, a deformable element is often desired to be electrically connected to another or other functional members of the MEMS device. For example, a torsional hinge of a micromirror device is expected to be electrically connected to an external control source and the reflective mirror plate that is attached thereto. The electrical connection of the torsional hinge to the external source can be accomplished in many ways, one of which is through the hinge posts that are electrically and physically connected to the torsional hinge. In examples wherein all layers (the core layer(s) and the protective layer(s)) of the deformable element are electrically conductive or semiconductive, desired electrical connection can be achieved by connecting the deformable element to the target functional member in the same way as if the deformable element is a single layered-electrically conductive structure. For demonstration purposes, FIG. 7a schematically illustrates an exemplary connection between a deformable element and other functional members in the MEMS device.

Figure 7A:
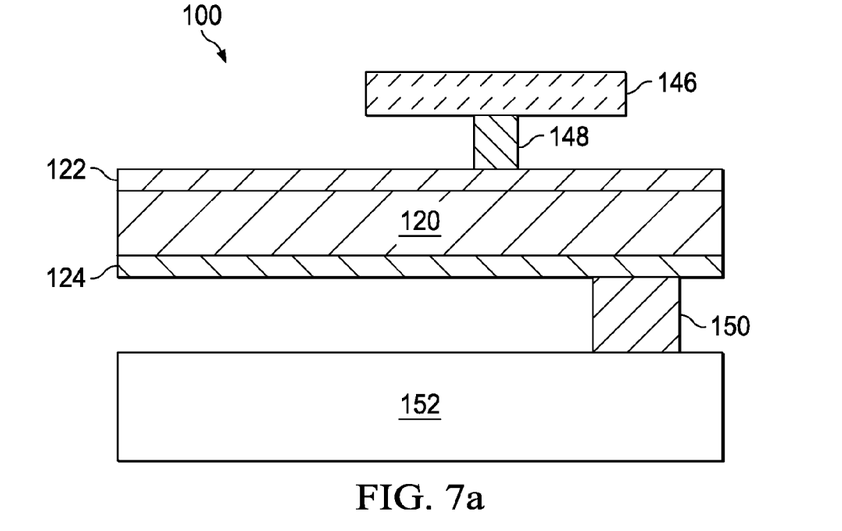
FIG. 7a schematically illustrates a scheme for electrically connecting a deformable element to another electrically conductive member in a MEMS device.

Referring to FIG. 7a, deformable element 100 comprises core layer 120 and protective layers 122 and 124 as discussed above with reference to FIG. 3 (or FIG. 4a through FIG. 4c). In this example, all layers of 120, 122, and 124 are electrically conductive. Electrical connection of the deformable element 100 to functional member 146 (e.g. a mirror plate of a micromirror device when deformable element 100 is a torsional hinge) can be simply achieved through formation of electrically conductive post 148 that electrically and physically connects functional member 146 and layer 122. Similarly, electrical connection of the deformable element 100 to substrate 152 (e.g. the electrodes on a semiconductor substrate of a micromirror device) can be achieved by physically and electrically connecting post 150 to layer 124 and substrate 152.

The above connection scheme can be fabricated in many ways. For example, substrate 152 having formed thereon other desired functional members, such as electrodes and electrical circuits, can be provided. A sacrificial material can be deposited on substrate 152 with a thickness determined by the desired distance between the bottom surface of deformable element 100 and the top surface of substrate 152. The sacrificial material can be any suitable material, such as an organic material such as resist, amorphous silicon, poly-silicon, or other materials.

The formed sacrificial material can then be patterned, for example, to form a via region at the desired location of post 150 and with a dimension that matches the dimension of the desired post 150. The material for post 150 can be deposited on the patterned sacrificial layer followed by etching the deposited post material so as to form post 150. Deformable 100 can then be formed on the sacrificial layer and the formed post 150 by sequentially depositing layers 124, 120, and 122. Patterning and etching of the deposited layers in deformable element 100 can be performed when necessary.

Etching of the layers in deformable element 100 can be accomplished in many ways depending upon the specific material used in the deformable element. For example, the layers of the deformable element (100) can be etched with a chlorine chemistry or a fluorine chemistry where the etchant is a perfluorocarbon or hydrofluorocarbon (or $SF_6$) that is energized so as to selectively etch the hinge layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching the deformable element layer (e.g. chlorine chemistry for a metal layer, hydrocarbon or fluorocarbon (or $SF_6$) plasma for silicon or silicon compound layers, etc.).

Another sacrificial layer can be deposited on the formed deformable element with a thickness determined by the desired distance between the top surface of deformable element 100 and the bottom surface of functional member 146. The deposited sacrificial layer can be patterned to form post 148 followed by depositing and patterning a material of post 148 so as to form the desired post 148. Functional member 146 can then be formed on the sacrificial layer and formed post 148 through material deposition, layer patterning and etching. Finally, the sacrificial layers can be removed by etching so as to release the device.

Figure 7B:
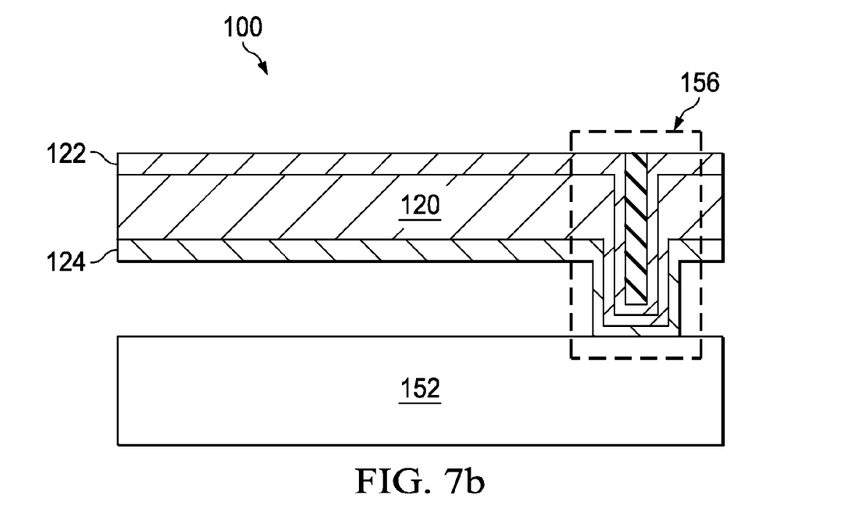
FIG. 7b schematically illustrates another scheme for electrically connecting a deformable element to another electrically conductive member in a MEMS device.

Other than using a separate electrically conductive material to achieve electrical connection, conductive layers of the deformable element can be used for achieving electrical connections, an example of which is schematically illustrated in FIG. 7b. Referring to FIG. 7b, electrical connection between deformable element 100 and substrate 152 can be accomplished through connector 156 that comprises materials of the deformable element 100. Specifically, conductive layers 124, 120, and 122 form side walls of connector 156. For improving the mechanical property of the connector such that the connector can be employed as a post for supporting and holding the deformable element (100) on substrate 152, the connector (156) can be filled with a suitable material with desired mechanical properties.

The connection mechanism as illustrated in FIG. 7b can be fabricated in many ways. In one example, substrate 152 having formed thereon desired functional members, such as electrodes and electrical circuits, is provided. A sacrificial material can be deposited on substrate 152 with a thickness determined by the desired distance between the bottom surface of deformable element 100 and the top surface of substrate 152. The sacrificial material can be any suitable materials, such as an organic material such as a resist, amorphous silicon, poly-silicon, or other materials.

The formed sacrificial material can then be patterned, for example, to form a via region at the desired location of connector 156 and with a dimension that matches the dimension of the desired connector 156. Layers 124, 120, and 122 of deformable element 100 can be sequentially deposited on the patterned sacrificial layer. After the deposition, layers 124, 120, and 122 fill the side walls, as well as the bottom of the via region formed on the sacrificial layer. Because all layers of the deformable element 100 in this example are conductive layers, the portions of the layers 124, 120, and 122 in the via region (e.g. the bottom of the via region) formed on the sacrificial layer are electrically connected to substrate 152. For improving the mechanical property of the connector such that the connector can further act as a post for supporting and holding the deformable element on substrate 152, a filling material with a desired mechanical property can fill the opening of the connector (156) as schematically illustrated in FIG. 7b.

The deposited layers 124, 120, and 122 can be patterned so as to form the desired deformable element. Patterning and etching of the layers in deformable element 100 illustrated in FIG. 7b can be performed in the same way as that discussed above with reference to FIG. 7a, which will not be repeated herein. The sacrificial material can then be removed by etching so as to release the MEMS device.

As discussed above, a deformable element may comprise electrically insulating layers. In this instance, a conduction opening can be formed in the electrically insulating layer. An electrically conductive material can then be used for connecting the conductive layers in the deformable element to another or other functional members in the MEMS device. For demonstration purposes, FIG. 8a schematically illustrates an electrical connection scheme for deformable elements having insulating layers.

Figure 8A:
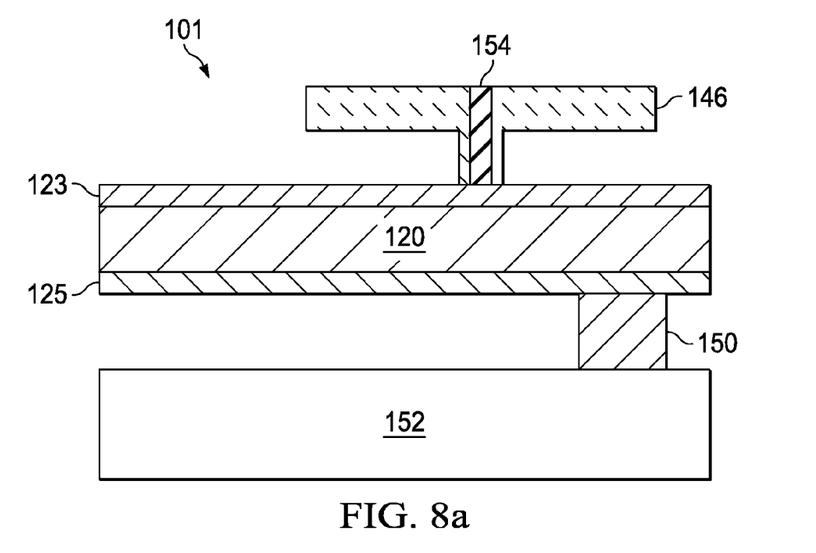
FIG. 8a schematically illustrates yet another scheme for electrically connecting a deformable element to another electrically conductive member in a MEMS device.

Referring to FIG. 8a, deformable element 101 comprises electrically conductive core layer 120 and insulating protective layers 123 and 125 that are formed on the top and bottom major surfaces of core layer 120. For electrically connecting the conductive layer 120 to substrate 152, an opening is formed on layer 125, through which conductive connector 150 passes and connects conductive core layer 120 to substrate 152. With the same mechanism, an opening is formed on insulating layer 123; and conductive connector 154 connects the conductive core layer 120 to functional member 146 through the opening in layer 123.

An exemplary fabrication method for making the structure as illustrated in FIG. 8a can be started from providing substrate 152 followed consecutive depositions of the first sacrificial layer and layer 125 on substrate 152. The deposited layer 125 can be patterned and etched, after which an opening at a location of desired connector 150 is formed in layer 125.

At location of the opening of layer 125, the portion of the first sacrificial layer is removed so as to form a via region with the desired portion of the top surface of substrate 152 being exposed. Connector 150 can then be formed at the opening and the via region by depositing a selected conductive material followed by patterning and etching.

After forming connector 150, conductive core layer 120 can be formed by depositing a selected material followed by patterning and etching. After forming layer 120, layer 120 can be physically and electrically connected to connector 150 as illustrated in FIG. 8a.

Insulating layer 123 can be formed on the formed core layer 120 by depositing a selected material for layer 123 followed by patterning. After patterning, an opening is formed at a location at which desired connector 154 is to be formed. The second sacrificial layer can be deposited on layer 123 having the opening. The deposited second sacrificial layer is patterned so as to form a via region that is aligned to the opening in layer 120 such that a portion of conductive layer 120 is exposed through the opening in layer 123 and the via region in the second sacrificial layer. A selected material for connector 154 can then be deposited on the patterned second sacrificial layer. After the deposition, a portion of the connector material is deposited on and physically contacts the exposed portion of conductive layer 120. The deposited layer for connector 154 can then be patterned so as to form connector 154. Functional member 146 can be formed on the second sacrificial layer and the formed connector 154. The first and second sacrificial layers can be removed so as to release the deformable element (101).

Figure 8B:
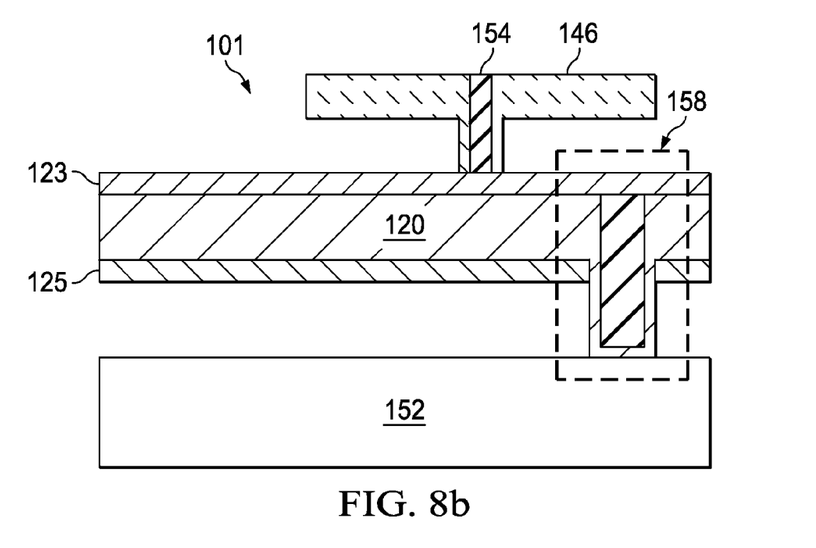
FIG. 8b schematically illustrates yet another scheme for electrically connecting a deformable element to another electrically conductive member in a MEMS device.

Another exemplary connection scheme for connecting the deformable element to other functional members is schematically illustrated in FIG. 8b. Referring to FIG. 8b, deformable element 101 is electrically connected to substrate 152 through connector 158; and connector 158 is formed by layers of deformable element 101. Specifically, insulating layer 125 of deformable element 101 comprises an opening; and a portion of the conductive core layer 120 extends through the opening in layer 125 and physically/electrically contacts substrate 152 as schematically illustrated in FIG. 8b. In this configuration, the electrical connection of the deformable element to the substrate (152) is accomplished through the opening of insulating layer 125 and the conductive layer 120. For improving the mechanical property of connector 158, the hollow portion of connector 158 can be filled with a material with desired mechanical properties.

The electrical connection of the deformable element to functional member 146 can be accomplished through an opening in insulating layer 123 and the conductive material of connector 154. Specifically, insulating layer 123 comprises an opening, through which conductive material of connector 154 pass and physically/electrically contacts to the conductive layer 120. The material of connector 154 may or may not be the same as a material for functional member 146.

The structure as illustrated in FIG. 8b can be fabricated in many ways, one of which starts from providing substrate 152 followed by depositing the first sacrificial layer and layer 125 on the substrate (152). The deposited layer 125 can be patterned followed by patterning of the deposited first sacrificial layer. After patterning layer 125 and the first sacrificial layer, an opening is formed in layer 125 and a via region aligned to the opening is formed such that a portion of the substrate to be connected to the deformable element (101) is exposed through the via region in the first sacrificial layer and the opening in layer 125.

The selected conductive material for conductive layer 120 is deposited on the formed layer 125 so as to form layer 120. After deposition, a portion of conductive layer 120 extends through the opening in layer 125, fills the side walls and the bottom of the via region formed in the first sacrificial layer, and forms connector 158. The hollow portion of the via region can alternatively be filled with a selected material having a desired mechanical property so as to improve the mechanical property of connector 158. Specifically, connector 158 can be filled with a mechanical enhancing material such that connector 158 can also act as a support for holding the deformable element (101) above substrate 152.

Insulating layer 123 can be formed on conductive core layer 120 by depositing a selected material for layer 123 followed by patterning and etching so as to form the deposited layer 123 into the desired shape. For connecting the conductive core layer 120 to functional member 146, an opening can be made in insulating layer 123, for example, at the location of the desired connector 154 such that a portion of the conductive core layer 120 can be exposed through the opening in the insulating layer 123.

The second sacrificial layer can be deposited on the formed insulating layer 123. The second sacrificial layer has a thickness determined by the desired distance between the top surface of layer 123 and the bottom surface of functional element 146 that is to be formed on the second sacrificial layer.

The second sacrificial layer is patterned, for example, to form a via region at the location of the opening in the insulating layer 123 such that the portion of conductive layer 120 can be exposed through the opening in insulating layer 123 and the via region formed in the second sacrificial layer.

A conductive material of functional member 146 can then be deposited on the patterned second sacrificial layer. After the deposition, the conductive material fills the side wall of the via region in the second sacrificial layer; and can be physically connected to the exposed portion of conductive layer 120 through the opening in the insulating layer 120. As a consequence, the functional member (146) is electrically connected to the conductive layer 120 of the deformable element. As an alternative feature, connector 154 can be filled with a selected mechanical enhancing material to enhance the mechanical property of connector 154, especially when connector 154 is desired to act as a mechanical supporter for holding functional member 146 above substrate 152 and deformable element 101.

After forming all functional members of the MEMS device, the first and second sacrificial layers can be removed so as to release the deformable element (101).

In the examples as discussed above with reference to FIG. 8a and FIG. 8b, the insulating layers are the outer layers of the deformable elements. In other examples, a deformable element may have an insulating layer inside the body of the deformable element. Electrical connections of such deformable elements can also be achieved through openings in insulating layers. For demonstration purposes, an example is schematically illustrated in FIG. 9.

Figure 9:
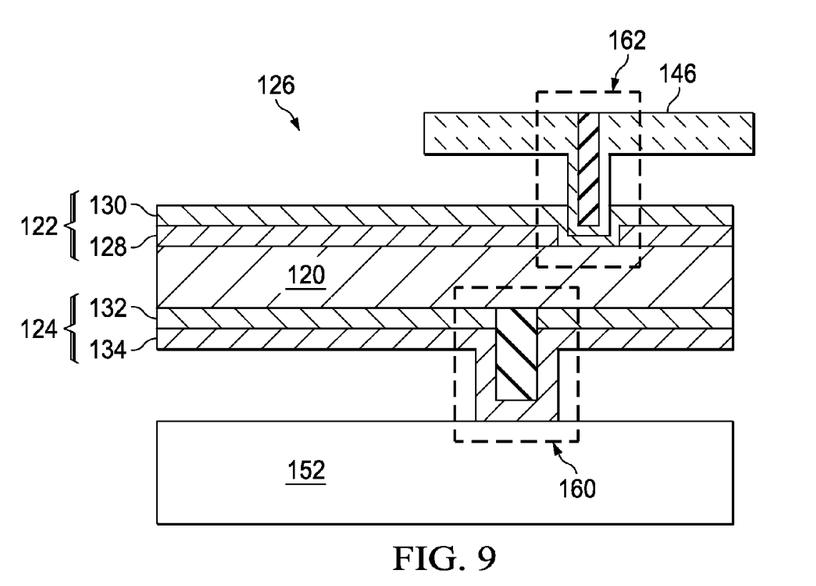
FIG. 9 schematically illustrates yet another scheme for electrically connecting a deformable element to another electrically conductive member in a MEMS device.

Referring to FIG. 9, deformable element 126 comprises conductive core layer 120 and protective layers 122 and 124. Protective layer 122 comprises a conductive layer 130 and an insulating layer 128; and protective layer comprises conductive layer 134 and insulating layer 132.

An electrical connection between the deformable element (126) and substrate 152 (e.g. an electrode of substrate 152) can be achieved through connector 160. Connector 160, in this example, is formed substantially by conductive layer 134 in protective layer 124 and conductive core layer 120. Specifically, the conductive layer 134 fills the side wall of connector 160. The conductive core layer 120 is physically and thus electrically connected to the conductive layer 134 through an opening in insulating layer 132. Therefore, the conductive core layer 120 is electrically connected to substrate 152 through the opening in insulating layer 132 and the conductive layer 134.

The electrical connection between the conductive core layer 120 and functional member 146 is accomplished by connector 162. Connector 162 in this example comprises a via region that is formed/filled by conductive material of functional member 146 and the conductive material of layer 130, wherein the via region passes through an opening in insulating layer 128 and is physically connected to the conductive core layer 120 at the bottom of the via region.

The structure illustrated in FIG. 9 can be fabricated in many ways. In one example, substrate 152 is provided. The substrate may have formed thereon electrodes and circuits, for example, when the MEMS device is a micromirror device and the deformable element is a deformable hinge (e.g. a torsional hinge).

The first sacrificial layer is deposited on the substrate (152) followed by patterning so as to form the first via region for forming connector 160. Accordingly, the first via region has a dimension determined by the dimension of connector 160 to be formed. The material of the conductive layer 134 is deposited. After the deposition, the material of layer 134 fills the side walls and the bottom of the first via region. At the bottom of the first via region, the material of layer 134 is physically and thus electrically connected to the desired portion of substrate 152—resulting in the desired electrical connection between layer 134 and substrate 152.

Before forming the insulating layer 132, the second sacrificial layer can be deposited on the conductive layer 134 and patterned so as to fill the vacant space in the first via region for protecting the first via region during fabrication for the insulating layer 132. Specifically, the second sacrificial layer can be deposited on the conductive layer 134 followed by patterning. After the patterning, the vacant space in the first via region for connector 160 is filled with the material of the second sacrificial layer. The sacrificial material on the contacting area(s) between layer 134 and layer 132 to be formed afterwards, as well as other desired areas above the insulating layer 134 can be removed.

After forming the second sacrificial layer, insulating layer 132 can be formed by depositing and patterning. After patterning, an opening in layer 132 and at the location aligned to the first via region for connector 160 is made. The second sacrificial material filling the via region for connector 160 can be removed by etching.

The selected material for the conductive core layer 120 can then be deposited on layer 132 that comprises the opening. After the deposition, the material of the conductive core layer 120 fills the via region for connector 160 through the opening in layer 132—resulting in the desired electrical connection between the core layer 120 and the conductive layer 134, as schematically illustrated in FIG. 9. Through the conductive layer 134 in the via region for connector 160, the conductive core layer 120 is electrically connected to substrate 152.

On the formed conductive core layer 120, the insulating layer 128 can be formed through material deposition and patterning. For forming connector 162, an opening is formed in the insulting layer 128 through the patterning process.

The conductive layer 130 can be formed on the patterned insulating layer 128 by depositing the selected conductive material for layer 130. After the deposition, the conductive material for layer 130 passes through the opening in layer 128 and is physically/electrically connected to the exposed portion of the conductive core layer 120 as illustrated in FIG. 9. As a consequence, the conductive layer 130 is electrically connected to the conductive core layer 120 through the opening of the insulating layer 128.

Functional member 146 can then be formed on the third sacrificial layer. The selected conductive material of functional member 146 is deposited on the patterned third sacrificial layer. After the deposition, the conductive material of functional member 146 fills the side wall of the via region in the third sacrificial layer, and is electrically/physically connected to the portion of layer 130 at the bottom of the via region for connector 162. The deposited layer 146 can be patterned so as to form layer 146 into the desired shape. As an alternative feature, connector 162 can be filled with other materials, such as a mechanical enhancing material for enhancing the mechanical property of connector 162. In particular example wherein the MEMS device is a micromirror device with the deformable element (126) being a deformable hinge and functional member 146 being a mirror plate, connector 162 can further be used as a mechanical support for holding the mirror plate (functional member 146) above substrate 152. In this example, a mechanical enhancing material is of great importance for filling connector 162 so as to improve the mechanical property of connector 162.

Functional member 146 can then be formed on the third sacrificial layer. The selected conductive material of functional member 146 is deposited on the patterned third sacrificial layer. After the deposition, the conductive material of functional member 146 fills the side wall of the via region in the third sacrificial layer, and is electrically/physically connected to the portion of layer 130 at the bottom of the via region for connector 162. The deposited layer 136 can be patterned so as to form layer 146 into the desired shape. As an alternative feature, connector 162 can be filled with other materials, such as a mechanical enhancing material for enhancing the mechanical property of connector 162. In particular example wherein the MEMS device is a micromirror device with the deformable element (126) being a deformable hinge and functional member 146 being a mirror plate, connector 162 can further be used as a mechanical support for holding the mirror plate (functional member 146) above substrate 152. In this example, a mechanical enhancing material is of great importance for filling connector 162 so as to improve the mechanical property of connector 162.

After forming the desired functional members of the MEMS device, the first and the third sacrificial layers can be removed by etching so as to release the MEMS device.

Examples of the deformable element as discussed above, as well as other variations within the scope of this disclosure, can be used in many different MEMS devices wherein deformable elements are employed. In one example, a deformable element can be used as a deformable hinge, such as a torsional hinge in a micromirror device, as schematically illustrated in FIG. 10.

Figure 10:
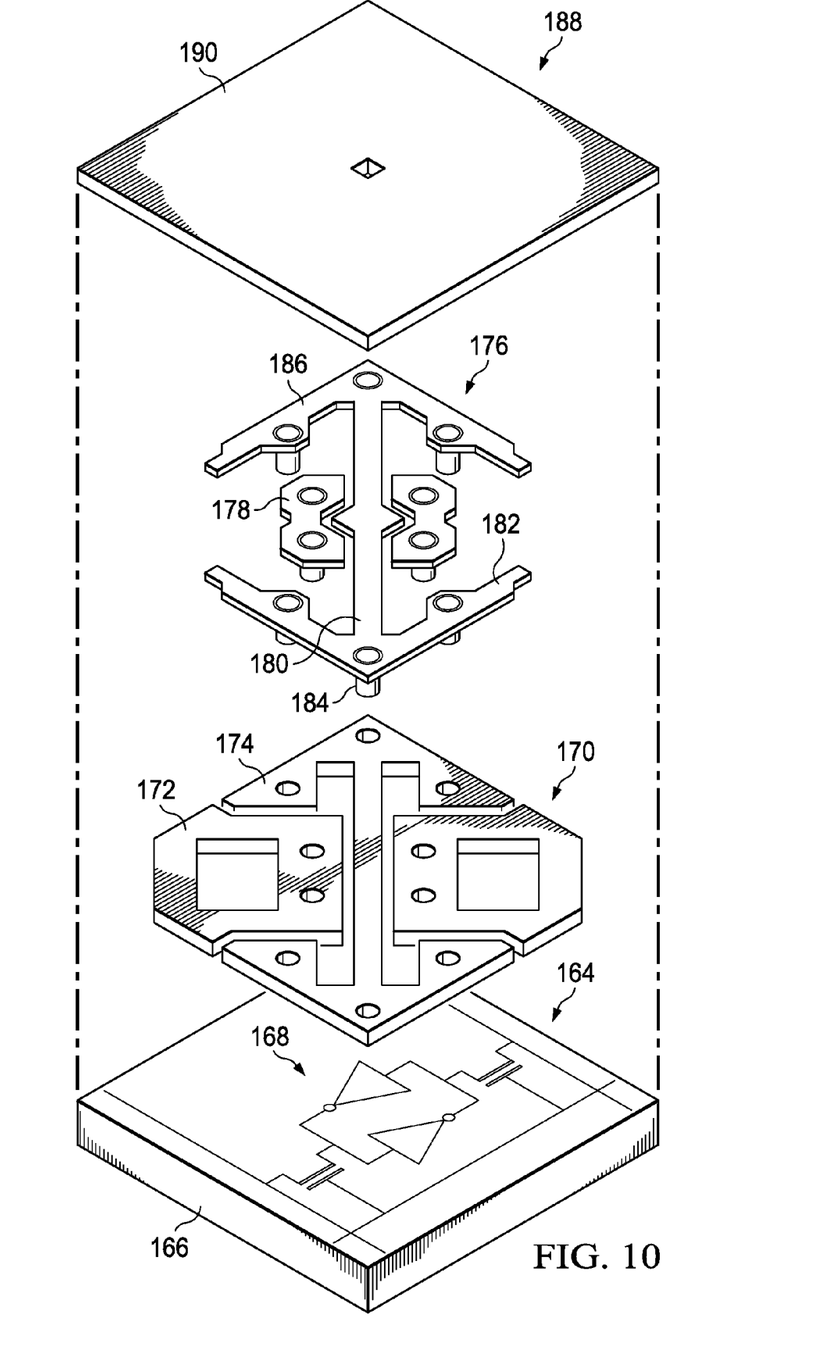
FIG. 10 schematically illustrates an exemplary micromirror device having a torsional hinge in which an example of this disclosure is implemented.

Referring to FIG. 10, the micromirror device in this example comprises substrate portion 164 wherein substrate 166 is provided. The substrate (166) can be a semiconductor substrate on which standard electronic circuits can be formed.

The substrate (166) comprises an electronic circuit (168) that is provided for controlling electronic signals (e.g. voltages) applied to the electrodes (e.g. addressing electrode 172 and raised electrode 178) and the mirror plate (190) above the substrate.

Formed on the substrate portion 164 is an electrode pad portion (170). The electrode portion comprises electrodes, such as electrode 172, to which electronic signals can be applied for deflecting the mirror plate. For this purpose, the electrode(s) is electronically connected to the electric circuit (168) of substrate 166. The electrode portion (170) may comprise hinge connection pad 174. The hinge connection pad 174 can be used for electronically connecting the deformable hinge (180) to the contact pads and/or electronic circuits on substrate 166.

Hinge portion 176 is formed on electrode portion 170 as illustrated in FIG. 10. The hinge portion comprises deformable hinge 180, which is a torsional hinge in this example. The deformable hinge can be configured as any exemplary deformable elements as discussed above with reference to FIG. 1 through FIG. 9.

The deformable hinge (180) is held by and electronically connected to hinge arm 186. The hinge arm (186) is electronically connected to hinge connection pad 174 through hinge posts, such as hinge post 184. The hinge posts each can be configured as any one of the electrical connectors as discussed above with reference to FIG. 7a through FIG. 9 (e.g. connectors 150 in FIG. 7a and FIG. 8a, connector 156 in FIG. 7b, connector 158 in FIG. 8b, and connector 160 in FIG. 9).

Other features, such as spring tip 182 acting as a stopping mechanism, can alternatively be formed in the hinge portion (176).

The reflective mirror plate 190 of the mirror portion (188) is formed on a separate plane above the plane of the deformable hinge (180). The mirror plate is attached and electronically connected to the deformable hinge (180) through a mirror post such that the reflective mirror plate is capable of rotating above substrate 166.

It will be appreciated by those of skill in the art that a new and useful deformable hinge and a MEMS device such as a micromirror device having the deformable hinge have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

The invention claimed is:

1. A microelectromechanical device, comprising:
   a substrate having an electrode;
   a deformable element comprising a conductive core layer and a protective layer formed over said conductive core layer, said deformable element being physically supported over said substrate by a first connector providing electrical connection between said conductive core layer and said electrode; and
   a functional member physically supported over said deformable element by a second connector providing electrical connection between said conductive core layer and said functional member;
   wherein said protective layer comprises a material for blocking a combination of an undesired chemical component with said conductive core layer, wherein said undesired chemical component is capable of changing a mechanical property of said deformable element if combined with said deformable element.

2. The device of claim 1, wherein said protective layer comprises a thin film formed by a standard thin-film fabrication technique on a major surface of the deformable element; and is physically connected to the major surface.

3. The device of claim 2, wherein said thin film is composed of an electrically conductive or insulating material or a semiconductor material.

4. The device of claim 2, wherein the thin film is a water barrier film capable of preventing the combination of water with the deformable element.

5. The device of claim 2, wherein the thin film is electrically insulating and has an opening in which an electrically conductive material is disposed.

6. The device of claim 1, wherein said protective layer comprises a getter material.

7. The device of claim 6, wherein said getter material comprises a thin-film that is disposed on a major surface of the deformable element.

8. The device of claim 1, wherein the functional member is a reflective mirror plate; and the deformable element is a torsional hinge to which the reflective mirror plate is attached such that the mirror plate is capable of rotating above the substrate.

9. The device of claim 1, wherein the protective layer comprises a protective film whose diffusion coefficient varies with a temperature at which the protective film is operated.

10. The device of claim 1, wherein the protective layer comprises an insulating layer formed over a main surface of the conductive core layer and a conductive layer formed over said insulating layer.

11. The device of claim 10, wherein said insulating layer has an opening; and at least one of said first and second connectors provides electrical connection with said conductive core layer through said opening.

12. The device of claim 11, wherein said conductive layer is formed over said insulating layer in contact with said conductive core layer through said opening; and said at least one of said first and second connectors provides electrical connection with said conductive core layer through said contact of said conductive layer with said conductive core layer through said opening.

13. The device of claim 11, wherein said insulating layer comprises a first insulating layer formed over an upper main surface of said conductive core layer, and a second insulating layer formed over a lower main surface of said conductive core layer; said first connector provides electrical connection with said upper main surface through a first opening in said first insulating layer; and said second connector provides electrical connection with said lower main surface through a second opening in said second insulating layer.

14. The device of claim 13, wherein said conductive layer comprises a first conductive layer formed over said first insulating layer in contact with said conductive core layer through said first opening, and a second conductive layer formed over said second insulating layer in contact with said conductive core layer through said second opening; said first connector provides electrical connection with said conductive core layer through contact of said first conductive layer with said conductive core layer through said first opening; and said second connector provides electrical connection with said conductive core layer through contact of said second conductive layer with said conductive core layer through said second opening.

15. The device of claim 14, wherein said first connector is formed substantially by said first conductive layer filling a portion of said first opening, and material of said functional member filling a remainder of said first opening; and said second connector is formed substantially by said second conductive layer filling a portion of said second opening, and material of said conductive core layer filling a remainder of said second opening.

16. The device of claim 15, wherein said deformable element comprises a torsional hinge of a micromirror device; and said functional member comprises a reflective mirror plate of said micromirror device.

17. A microelectromechanical device, comprising:
a substrate having an electrode;
a deformable element comprising a conductive core layer and a protective layer formed over said conductive core layer, said deformable element being physically supported over said substrate by a first connector providing electrical connection between said conductive core layer and said electrode; and
a functional member physically supported over said deformable element by a second connector providing electrical connection between said conductive core layer and said functional member;
wherein said protective layer comprises a material having a first diffusion coefficient at a first temperature range and a second diffusion coefficient at a second temperature range that is different from the first temperature range.

18. The device of claim 17, wherein the first temperature range is from room temperature to 70° C.; and wherein the second temperature range is from 70° C. to 500° C.

19. The device of claim 17, wherein the first diffusion coefficient is 20% or less of the second diffusion coefficient.

20. The device of claim 17, wherein the functional member is a reflective mirror plate; and the deformable element is a deformable hinge to which the reflective mirror plate is attached such that mirror plate is capable of moving relative to the substrate.

21. The device of claim 20, wherein the protective layer comprises a thin film comprising an electrically conductive or insulating material or a semiconductor material or a getter material.

22. The device of claim 21, wherein the protective layer comprises a water getter material.

23. The device of claim 17, wherein the protective layer comprises an insulating layer formed over a main surface of the conductive core layer and a conductive layer formed over said insulating layer.

24. The device of claim 23, wherein said insulating layer has an opening; and at least one of said first and second connectors provides electrical connection with said conductive core layer through said opening.

25. The device of claim 24, wherein said conductive layer is formed over said insulating layer in contact with said conductive core layer through said opening; and said at least one of said first and second connectors provides electrical connection with said conductive core layer through said contact of said conductive layer with said conductive core layer through said opening.

26. The device of claim 24, wherein said insulating layer comprises a first insulating layer formed over an upper main surface of said conductive core layer, and a second insulating layer formed over a lower main surface of said conductive core layer; said first connector provides electrical connection with said upper main surface through a first opening in said first insulating layer; and said second connector provides electrical connection with said lower main surface through a second opening in said second insulating layer.

27. The device of claim 26, wherein said conductive layer comprises a first conductive layer formed over said first insulating layer in contact with said conductive core layer through said first opening, and a second conductive layer formed over said second insulating layer in contact with said conductive core layer through said second opening; said first connector provides electrical connection with said conductive core layer through contact of said first conductive layer with said conductive core layer through said first opening; and said second connector provides electrical connection with said conductive core layer through contact of said second conductive layer with said conductive core layer through said second opening.

28. The device of claim 27, wherein said first connector is formed substantially by said first conductive layer filling a portion of said first opening, and material of said functional member filling a remainder of said first opening; and said second connector is formed substantially by said second conductive layer filling a portion of said second opening, and material of said conductive core layer filling a remainder of said second opening.

29. The device of claim 28, wherein said deformable element comprises a torsional hinge of a micromirror device; and said functional member comprises a reflective mirror plate of said micromirror device.

* * * * *